United States Patent
Miyazaki et al.

(10) Patent No.: US 9,074,078 B2
(45) Date of Patent: Jul. 7, 2015

(54) RUBBER COMPOSITION AND PNEUMATIC TIRE

(71) Applicant: SUMITOMO RUBBER INDUSTRIES, LTD., Kobe-shi, Hyogo (JP)

(72) Inventors: Tatsuya Miyazaki, Kobe (JP); Sumiko Miyazaki, Kobe (JP)

(73) Assignee: SUMITOMO RUBBER INDUSTRIES, LTD., Kobe-shi (JP)

( * ) Notice: Subject to any disclaimer, the term of this patent is extended or adjusted under 35 U.S.C. 154(b) by 0 days.

(21) Appl. No.: 14/148,427

(22) Filed: Jan. 6, 2014

(65) Prior Publication Data

US 2014/0213700 A1     Jul. 31, 2014

(30) Foreign Application Priority Data

Jan. 25, 2013    (JP) .................................. 2013-012597

(51) Int. Cl.
| | |
|---|---|
| *B60C 5/00* | (2006.01) |
| *C08L 15/00* | (2006.01) |
| *C08L 7/02* | (2006.01) |
| *B60C 1/00* | (2006.01) |

(52) U.S. Cl.
CPC ... *C08L 7/02* (2013.01); *B60C 1/00* (2013.01); *C08L 2205/16* (2013.01); *C08L 2310/00* (2013.01)

(58) Field of Classification Search
None
See application file for complete search history.

(56) References Cited

U.S. PATENT DOCUMENTS

| 2010/0076118 A1 | 3/2010 | Yano et al. | |
| 2014/0066548 A1* | 3/2014 | Miyazaki | ........................ 524/43 |

FOREIGN PATENT DOCUMENTS

JP     4581116 B2    11/2010

OTHER PUBLICATIONS

Tatsumi et al. Journal of Society of Rheology, Japan vol. 30, No. 1, 27-32, 2002.*

* cited by examiner

*Primary Examiner* — Vu A Nguyen
(74) *Attorney, Agent, or Firm* — Birch, Stewart, Kolasch & Birch, LLP

(57) ABSTRACT

Provided are a rubber composition in which microfibrillated plant fibers are sufficiently uniformly dispersed to improve tire performance requirements in a balanced manner, and a pneumatic tire formed from the rubber composition. The present invention relates to a rubber composition formed from a masterbatch containing a rubber latex and microfibrillated plant fibers, the masterbatch being obtained by stirring the microfibrillated plant fibers in a solvent with a circulation type or continuous homogenizer and mixing the resulting microfibrillated plant fiber solution with the rubber latex and a cationic polymer, the microfibrillated plant fibers having a mean fiber length of 10 to 150 μm, the microfibrillated plant fiber solution containing 0.1 to 2.0% by mass of the microfibrillated plant fibers, and the amount of the cationic polymer being 0.01 to 5 parts by mass per 100 parts by mass of the rubber component of the rubber latex.

3 Claims, 5 Drawing Sheets

Finished rubber thickness
(inner sidewall and
outer sidewall layers)
: 1.25 × 2 = 2.5 mm Sheet edge ← B   C   D → Middle of sheet Cylinder homogenizer Rotor Gap between the stator wall and rotor gear

RUBBER COMPOSITION AND PNEUMATIC TIRE

TECHNICAL FIELD

The present invention relates to a rubber composition and a pneumatic tire formed from the rubber composition.

BACKGROUND ART

Rubber compositions can be reinforced and improved in modulus (complex modulus) by adding thereto microfibrillated plant fibers (e.g. cellulose fibers) as filler. However, microfibrillated plant fibers have strong self-aggregation properties and poor compatibility with rubber components. For example, if microfibrillated plant fibers are added to and mixed with a rubber latex, about 20% of the microfibrillated plant fibers added still remain in the solution instead of being incorporated into the rubber component.

Also, in preparing a masterbatch by mixing a rubber latex and microfibrillated plant fibers, agglomerates of the microfibrillated plant fibers are likely to be formed in the masterbatch. Therefore, in a tire formed from such a masterbatch, the agglomerates may cause premature wear, cracks, chipping, and interlayer separation, which may even lead to air leakage and loss of handling stability.

Thus, though the addition of microfibrillated plant fibers improves modulus, it decreases the tire performance requirements of handling stability, abrasion resistance, and durability, which may result in loss of the functions and advantages of tires. Therefore, this method has room for improvement.

In general, microfibrillated plant fibers are dispersed into a solvent by a homogenizer before use. However, cylinder homogenizers have room for improvement, since they provide poor circulation of microfibrillated plant fibers, failing to uniformly defibrate the microfibrillated plant fibers. Propeller homogenizers also have room for improvement, since they have a small shearing force and therefore low defibration efficiency and also since microfibrillated plant fibers adhere to the propeller blades and the adhered fibers are thus prevented from being defibrated.

Patent Literature 1 discloses a method of chemically modifying microfibrillated plant fibers so as to improve the compatibility of the rubber component and microfibrillated plant fibers. This method, however, is not sufficient for overall improvement of the properties described above.

CITATION LIST

Patent Literature

Patent Literature: 1 JP 4581116 B

SUMMARY OF INVENTION

Technical Problem

The present invention aims to solve the problems and provide: a rubber composition in which microfibrillated plant fibers are sufficiently uniformly dispersed to improve tire performance requirements in a balanced manner; and a pneumatic tire formed from the rubber composition.

Solution to Problem

The present invention relates to a rubber composition, formed from a masterbatch containing a rubber latex and microfibrillated plant fibers, the masterbatch being obtained by stirring the microfibrillated plant fibers in a solvent with a circulation type or continuous homogenizer and mixing the resulting microfibrillated plant fiber solution with the rubber latex and a cationic polymer, the microfibrillated plant fibers having a mean fiber length of 10 to 150 μm, the microfibrillated plant fiber solution containing 0.1 to 2.0% by mass of the microfibrillated plant fibers, and an amount of the cationic polymer being 0.01 to 5 parts by mass per 100 parts by mass of a rubber component of the rubber latex.

The masterbatch preferably contains 5 to 30 parts by mass of the microfibrillated plant fibers per 100 parts by mass of the rubber component of the rubber latex.

Preferably, the rubber component of the rubber latex is an isoprene-based rubber, and the isoprene-based rubber in the masterbatch has a phosphorous content of 200 ppm or less.

The rubber composition preferably contains 0.1 to 20 parts by mass of the microfibrillated plant fibers per 100 parts by mass of total rubber component in the rubber composition.

The rubber composition is preferably for use in a tread, a sidewall, an inner sidewall layer, a breaker cushion, a base tread, a tie gum, a bead apex, a clinch apex, a strip apex, or a breaker edge strip.

The present invention also relates to a pneumatic tire, formed from the rubber composition.

Advantageous Effects of Invention

Since the rubber composition of the present invention is formed from a masterbatch that is obtained by mixing a specific microfibrillated plant fiber solution prepared using a circulation type or continuous homogenizer, with a rubber latex and a certain amount of a cationic polymer, use of such a rubber composition for a tire component (e.g. sidewall) can provide a pneumatic tire in which tire performance requirements such as handling stability and ride comfort are improved in a balanced manner.

DESCRIPTION OF EMBODIMENTS

The rubber composition of the present invention is prepared from a masterbatch that is obtained by mixing a specific microfibrillated plant fiber solution prepared using a circulation type or continuous homogenizer, with a rubber latex and a certain amount of a cationic polymer.

Required for improving tire performance by the use of microfibrillated plant fibers are as follows: uniform incorporation of microfibrillated plant fibers into the rubber component of a masterbatch; and rapid dispersion of the microfibrillated plant fibers into other rubber components in kneading the masterbatch with the rubber components. These are, however, difficult to achieve by conventional methods.

In the present invention, a microfibrillated plant fiber solution that contains 0.1 to 2.0% by mass of microfibrillated plant fibers having a mean fiber length of 10 to 150 μm is prepared using a circulation type or continuous homogenizer. The microfibrillated plant fiber solution is then mixed with a rubber latex and a cationic polymer that is a flocculant to provide a masterbatch. The resultant masterbatch is kneaded with additives such as other rubber components. In this way, the present invention enables the preparation of a rubber composition with the microfibrillated plant fibers uniformly dispersed therein, in contrast to the conventional methods. Then, use of the rubber composition for a tire component provides a pneumatic tire in which handling stability, ride comfort, and the like are improved in a balanced manner. The present invention also enables favorable abrasion resistance and processability since it makes it possible to reduce the amount of agglomerates of microfibrillated plant fibers. Further, the present invention enables thinning of the sidewall, tread, and bead portions while maintaining favorable handling stability, which leads to better fuel economy of vehicles.

<Masterbatch>

The masterbatch may be prepared by, for example, a method including: a step (I) of stirring microfibrillated plant fibers in a solvent with a circulation type or continuous homogenizer to prepare a microfibrillated plant fiber solution that contains 0.1% to 2.0% by mass of microfibrillated plant fibers having a mean fiber length of 10 to 150 μm; a step (II) of mixing the microfibrillated plant fiber solution prepared in the step (I) with a rubber latex to provide a mixture and coagulating the mixture; and a step (III) of washing a coagulum formed in the step (II). In the step (II), the cationic polymer is added as a flocculant, that is, a coagulation aid prior to or subsequently to the coagulation of the mixture.

(Step (I))

In the step (I), a microfibrillated plant fiber solution is prepared using a circulation type or continuous homogenizer. The circulation type or continuous homogenizer enables easy preparation of a solution in which microfibrillated plant fibers having a predetermined mean fiber length are uniformly dispersed.

Figure 3:
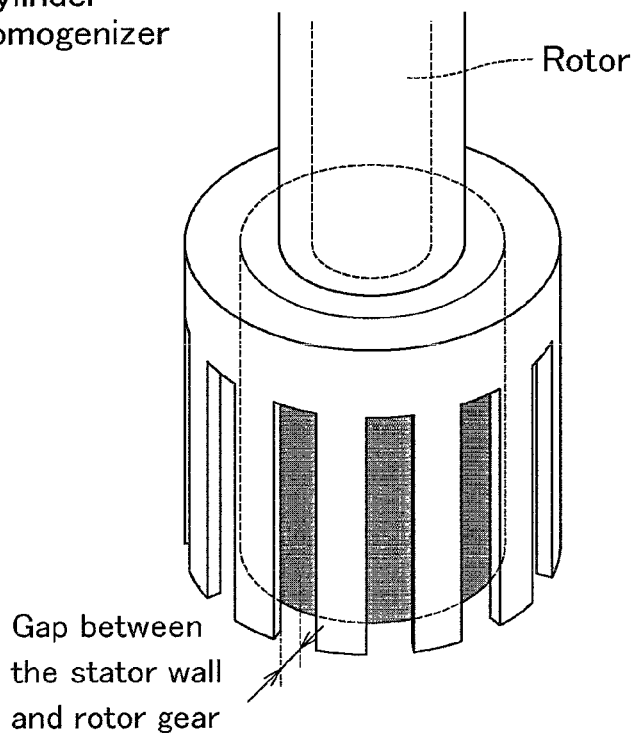
FIG. 3 is a schematic view of a cylinder homogenizer.
Figure 4:
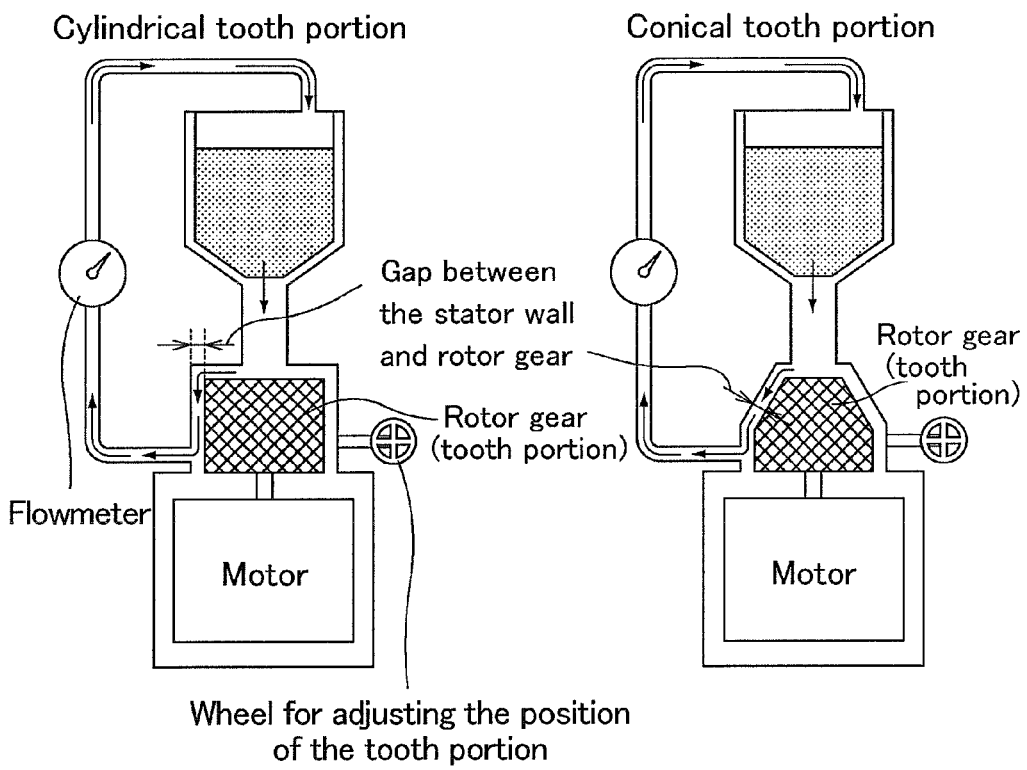
FIG. 4 shows schematic views of circulation type homogenizers.
Figure 5:
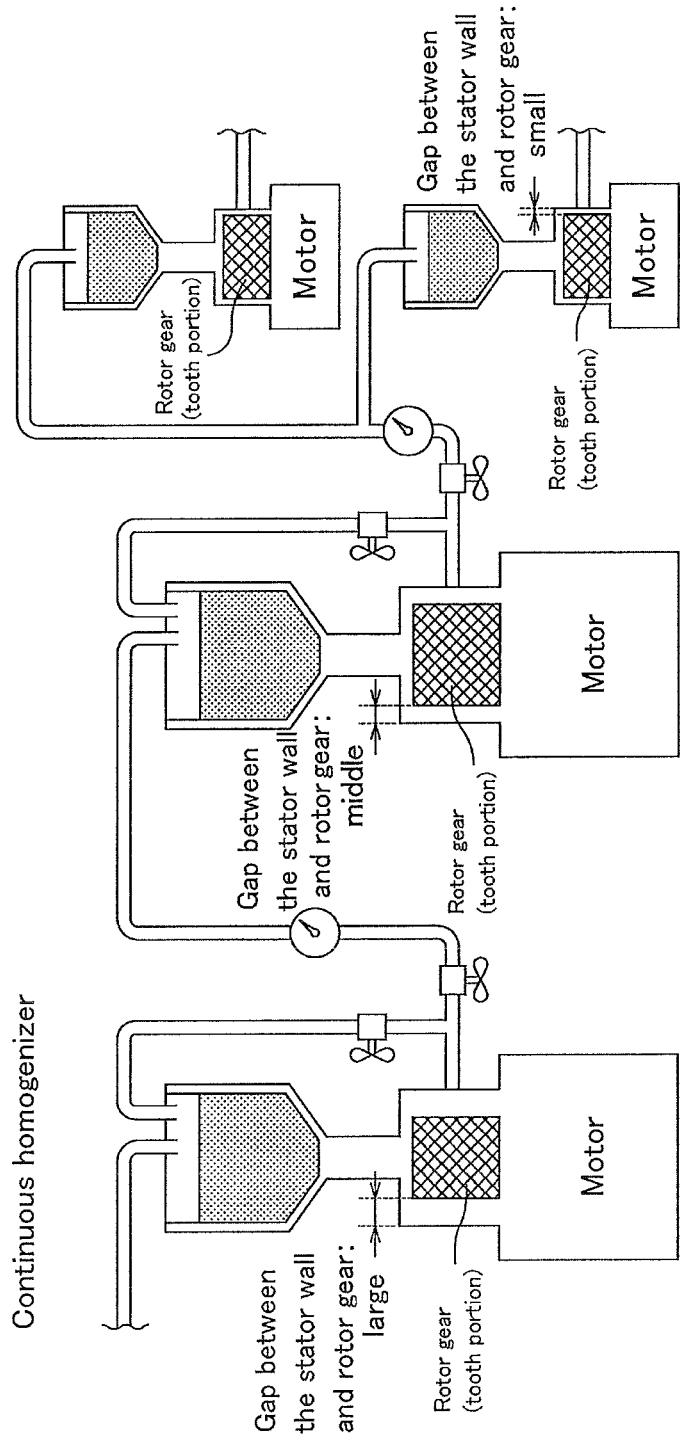
FIG. 5 is a schematic view of a continuous homogenizer.

In the following, the homogenizer is described with reference to drawings. FIG. 3 is a schematic view of a cylinder homogenizer. FIG. 4 shows schematic views of two different circulation types of homogenizers. One has a cylindrical rotor gear (or tooth portion), and the other has a conical rotor gear (or tooth portion). FIG. 5 is a schematic view of a continuous homogenizer.

The cylinder homogenizer has a fixed gap between the stator wall and rotor gear, and thus the defibration efficiency can be controlled only by the rotation rate. Though the cylinder homogenizer is advantageous in that the homogenizer itself can be downsized, it is disadvantageous in that the viscosity of the solution around the cylinder increases as the defibration proceeds, which causes a difference in the viscosity of the solution between around the cylinder and around the wall, bottom or other portions of the container, resulting in non-uniform defibration.

In the circulation type homogenizer, the defibration efficiency can be controlled by both the gap between the stator wall and rotor gear and the rotation rate during operation. In addition, the fiber length and viscosity of the solution can be estimated from the flow meter reading during the defibration. The circulation type homogenizer, therefore, can more efficiently finely-mill microfibrillated plant fibers as compared with the cylinder homogenizer.

The continuous homogenizer can be referred to as a plurality of circulation type homogenizers connected together. Since the flow rate increases as the gap between the stator wall and rotor gear increases, it is necessary to adjust the scale of the homogenizer and the number of downstream homogenizers to be placed. When the conditions of a continuous homogenizer are varied during the operation, the continuous homogenizer can cause defibration in a fraction of the time required for the same level of defibration by a circulation type homogenizer. The continuous homogenizer is therefore a promising form for commercialization.

The gap between the stator wall and rotor gear and the rotation rate of the circulation type or continuous homogenizer are not particularly limited, and may be appropriately set according to the concentration and the like of the microfibrillated plant fiber solution. Typically, the gap between the stator wall and rotor gear is 0.01 to 1 mm, and the rotation rate is 10000 to 20000 rpm. In the examples of the present invention described later, the gap between the stator wall and rotor gear of the circulation type homogenizer was set to 0.01 to 0.8 mm, and the gaps between the stator wall and rotor gear of the continuous homogenizer were set to 1 mm, 0.5 mm, and 0.01 mm. In all of the homogenizers, the rotation rate was 15000 rpm.

The stirring time (defibration time) of the circulation type or continuous homogenizer is, though depending on the desired mean fiber length, typically 0.5 to 10 h (hours), and preferably 0.5 to 4 h.

Examples of the microfibrillated plant fibers (cellulose nanofibers) include those derived from natural products such as wood, bamboo, hemp, jute, kenaf, crop wastes, cloths, recycled pulp, wastepaper, bacterial cellulose, and ascidian cellulose. The method for preparing the microfibrillated plant fibers is not particularly limited, and for example, a method may be mentioned in which any of the above natural products is chemically treated with a chemical such as sodium hydroxide and then mechanically ground or beaten by a machine such as a refiner, a twin-screw kneader (twin-screw extruder), a twin-screw kneading extruder, a high-pressure homogenizer, a media agitating mill, a stone mill, a grinder, a vibrating mill, or a sand grinder.

The solvent to be used in the preparation of a microfibrillated plant fiber solution is not particularly limited, and examples thereof include water, alcohols, acetone, and hexane.

In the microfibrillated plant fiber solution, the amount of microfibrillated plant fibers (solids) is 0.1 to 2.0% by mass. If the amount of the fibers is smaller than 0.1% by mass, the microfibrillated plant fibers are likely to have a low probability of contacting the teeth of the homogenizer, which tends to lead to prolonged defibration time. If the amount is larger than 2.0% by mass, the viscosity of the solution tends to increase excessively as the milling of microfibrillated plant fibers proceeds, which tends to reduce the fluidity of the microfibrillated plant fibers and thereby result in the production of microfibrillated plant fibers having non-uniform lengths. In consideration of productivity, variation in fiber length, and variation in the complex modulus $E^*$ of the rubber composition, the amount of microfibrillated plant fibers is suitably 1.0 to 1.7% by mass.

Though the mechanism is unclear, the mean fiber length of microfibrillated plant fibers is considered to affect parameters associated with interactions between microfibrillated plant fibers, such as complex modulus $E^*$ of the resulting rubber composition, the space between one microfibrillated plant fiber and another, and complex modulus $E^*$ of the microfibrillated plant fibers. The mean fiber length of microfibrillated plant fibers is 10 to 150 μm, and is preferably 30 to 100 μm, and more preferably 40 to 90 μm, in terms of obtaining favorable rubber physical properties.

The mean fiber length of microfibrillated plant fibers is measured with a laser diffraction/scattering particle size distribution measuring apparatus.

The degree of disintegration (cutting) of microfibrillated plant fibers can be determined from the viscosity of the microfibrillated plant fiber solution. A higher viscosity indicates that the fibers are disintegrated better (the fibers are cut into shorter lengths). The viscosity of the microfibrillated plant fiber solution is preferably 50 mPa·s or higher, and more preferably 80 mPa·s or higher. In a solution with a viscosity of lower than 50 mPa·s, the fibers may not be sufficiently disintegrated, resulting in insufficient reinforcement. In addition, the fiber agglomerates may serve as fracture nuclei, reducing the elongation at break. The viscosity of the microfibrillated plant fiber solution is preferably 200 mPa·s or lower, and more preferably 150 mPa·s or lower. If the viscosity is higher than 200 mPa·s, the solution is less likely to be stirred easily, which may lead to local milling of the fibers around the stirring rotor, thereby making it difficult to uniformly mill the fibers. In addition, it may also be difficult to filtrate and separate the coagulum of the mixture of the solution and a rubber latex.

Here, the viscosity of the microfibrillated plant fiber solution is measured with a tuning-fork vibration viscometer at ordinary temperature (23° C.)

(Step (II))

In the step (II), the microfibrillated plant fiber solution prepared in the step (I) is mixed with a rubber latex, and then the resultant mixture is coagulated. The mixture of the rubber latex and the microfibrillated plant fiber solution may be prepared by, for example, sequentially adding dropwise or injecting these components, followed by mixing by a conventionally known method.

The rubber component of the rubber latex is not particularly limited, and examples thereof include isoprene-based rubbers, styrene-butadiene rubber, and butadiene rubber. Preferred are isoprene-based rubbers. Examples of the isoprene-based rubbers include natural rubber (NR), epoxidized natural rubber (ENR), and isoprene rubber (IR). Preferred is natural rubber.

The concentration of the rubber component (rubber solids) in the rubber latex is not particularly limited, and is preferably 10 to 80% by mass, and more preferably 20 to 60% by mass.

In the step (II), preferably, to the mixture of the microfibrillated plant fiber solution and the rubber latex, a certain amount of a cationic polymer as a flocculant (coagulation aid) is added and then an antioxidant is further added and mixed prior to the coagulation of the mixture. This inhibits degradation caused by oxidation, ozone, and ultraviolet rays. Also, this enables formation of an appropriately sized (about 0.1 to 5 mm) coagulum (crumb) in the coagulation of the mixture of the rubber latex and the microfibrillated plant fiber solution. The size of the coagulum is important in the handleability, filterability, and washing efficiency of the coagulum. If the size of the coagulum is smaller than 0.1 mm, the handleability tends to be deteriorated for example because prolonged filtration with a filtering material having a fine mesh size is required to prevent the microfibrillated plant fibers from leaking into the serum during filtration, and also because the coagulum has poor cohesive properties, requiring the use of a suction device or a centrifuge. If the size of the coagulum is larger than 10 mm, impurities inside the coagulum are less likely to be removed easily and therefore washing efficiency tends to become poor.

Examples of the cationic polymer include polymethacrylate polymers and polyacrylate polymers. Preferred are polymethacrylate polymers. Examples of the polymethacrylate polymers include cationized celluloses such as POIZ series (O-(2-hydroxy-3-(trimethylammonio)propyl)hydroxycellulose chloride) (produced by Kao Corporation) and C-303H (produced by MT AquaPolymer, Inc.). Cationized celluloses can be suitably used.

The amount of the cationic polymer per 100 parts by mass of the rubber component of the rubber latex is 0.01 parts by mass or more, preferably 0.1 parts by mass or more. The amount is 5 parts by mass or less, preferably 3 parts by mass or less. If the amount of the cationic polymer is less than 0.01 parts by mass, the effect of the cationic polymer added tends to be insufficient. If the amount is more than 5 parts by mass, a slip between the rubber component and the microfibrillated plant fibers tends to be caused, reducing the complex modulus E* and elongation at break of the rubber composition.

The antioxidant to be added is preferably a cresol antioxidant such as a t-butylated condensate of p-cresol and dicyclopentadiene, and dibutylhydroxytoluene, and is more preferably a t-butylated condensate of p-cresol and dicyclopentadiene. 6PPD (N-phenyl-N'-(1,3-dimethylbutyl)-p-phenylenediamine) and TMQ (2,2,4-trimethyl-1,2-dihydroquinoline polymer), which are generally used in tire compounding, are less likely to be incorporated easily into a rubber latex and thus tend to remain in the solution. This is presumably due to their high polarity.

Here, the amount of the antioxidant is not particularly limited, and should be about 0.1 to 10 parts by mass per 100 parts by mass of the rubber component of the rubber latex.

The method for coagulating the mixture may be acid coagulation, salt coagulation, methanol coagulation, or the like. In order to coagulate the mixture to prepare a masterbatch in which the microfibrillated plant fibers are uniformly dispersed, acid coagulation, salt coagulation, and a combination thereof are preferred. More preferred is acid coagulation. Examples of the acid to be used for the coagulation include formic acid, sulfuric acid, hydrochloric acid, acetic acid, and the like. From the viewpoint of cost, sulfuric acid is preferred. Examples of the salt include monovalent to trivalent metal salts (e.g. sodium chloride, magnesium chloride, calcium salts such as calcium nitrate and calcium chloride). The mixture is preferably coagulated by adding an acid or salt to adjust the pH of the mixture to 3 to 8 (preferably 4 to 7, more preferably 4.5 to 6), thereby coagulating the solids.

If the mixture is rapidly coagulated, then the microfibrillated plant fibers tend to be incorporated into the rubber latex, in the form of agglomerates just like fluff balls. This tendency makes the microfibrillated plant fibers less likely to disperse. For this reason, the mixture is preferably coagulated in conditions such that the microfibrillated plant fibers are slowly incorporated into the rubber latex. Based on this viewpoint, the temperature of the mixture in the coagulation thereof is preferably 40° C. or lower, and more preferably 35° C. or lower. Based on the same viewpoint, the coagulant such as acids, salts, and methanol described above is preferably added in stages (or in divided portions).

(Step (III))

In the step (III), the coagulum (agglomerated mass containing the agglomerated rubber and microfibrillated plant fibers) formed in the step (II) is washed.

Examples of the washing method include a method of diluting the coagulum with water and then centrifuging the dilution; and a method of diluting the coagulum with water, leaving the dilution at rest to allow the rubber to float or sediment, and then removing only the water phase. In the centrifugation, the coagulum may be at first diluted with water such that the rubber component accounts for 5 to 40% by mass, preferably 10 to 30% by mass, and then centrifuged at 5000 to 10000 rpm for 1 to 60 minutes. Also in the method of leaving the dilution at rest to allow the rubber to float or sediment, the addition of water and stirring may be repeated.

Here, the washing method is not limited to these methods. The coagulum may be washed by further removing phosphorous and nitrogen fractions remaining in the rubber using weak alkaline water (e.g. sodium hydrogen carbonate) to adjust the pH in the range of 4 to 7 (preferably of 4.5 to 6), followed by water washing. If necessary, the washed coagulum may be wrung with a roll wringer or the like and further washed. If the step of wringing the coagulum is added, the surface and the inside of the coagulum can have the same pH.

After the washing, the coagulum is typically dried by a conventionally known method (such as by using an oven or pressure reduction). In the examples of the present invention described later, the coagulum was dried at 40° C. for 12 hours under vacuum, reduced pressure.

If the coagulum is largely different from other rubber component(s) in pH, combination use thereof may cause variation in curing rate and physical properties. Since TSR, which is used in typical tire compounding, has a pH of 5.5, the dried coagulum preferably has a pH of 4 to 7, and more preferably 4.5 to 6.

Here, the pH of the dried coagulum can be measured with a pH meter after dropping water onto the coagulum and subsequently kneading it.

The dried coagulum is kneaded with a two-roll mill, Banbury mixer, or the like, whereby a masterbatch crumb containing rubber and microfibrillated plant fibers can be obtained. The masterbatch is preferably formed into a sheet having a thickness of a few centimeters with a mill roll to improve the cohesiveness and handleability. Here, the masterbatch may include other components as long as they do not inhibit the effect of the present invention.

The microfibrillated plant fibers are oriented in an extrusion direction (in a tread, base tread, sidewall, clinch, tie gum, bead apex, and the like, this direction corresponds to the circumferential direction of the tire, that is, the rotation direction). Thus, the fibers mainly reinforce the rubber composition in the extrusion direction, and only slightly contribute to the reinforcement in a perpendicular direction to the extrusion direction (in the radial direction of the tire). These characteristics make it possible to increase the complex modulus E* in the tire circumferential direction, which contributes to handling stability, while maintaining the complex modulus E* in the tire radial direction, which contributes to ride comfort. Thus, both handling stability and ride comfort can be ensured. Meanwhile, if the complex modulus E* in the tire circumferential direction is increased by a conventional method such as by adding a butadiene rubber containing syndiotactic crystals, then the elongation at break tends to be greatly reduced. In contrast, when the complex modulus E* in the tire circumferential direction is increased according to the present invention, satisfactory elongation at break is maintained. Because of these effects, the handling stability, ride comfort, and elongation at break can be improved in a balanced manner.

In the masterbatch, the amount of microfibrillated plant fibers per 100 parts by mass of the rubber component of the rubber latex is preferably 5 parts by mass or more, and more preferably 10 parts by mass or more. If the amount of the fibers is less than 5 parts by mass, a rubber composition including the masterbatch, when prepared so as to contain a required amount of microfibrillated plant fibers, may contain too much rubber derived from the masterbatch, which reduces space for other rubber components to be added for other effects. Or, the masterbatch containing less than 5 parts by mass of the fibers may fail to provide a rubber composition with microfibrillated plant fibers in an amount sufficient to improve performance. The amount of microfibrillated plant fibers is preferably 30 parts by mass or less, and more preferably 26 parts by mass or less. If the amount of the fibers is more than 30 parts by mass, the masterbatch may be much harder than other rubber components such as TSR, BR, and SBR, and therefore the masterbatch may not be easily mixed with the other rubber components. In turn, the dispersibility of microfibrillated plant fibers may be reduced so that the elongation at break and fuel economy may be deteriorated.

The rubber component in the masterbatch is preferably an isoprene-based rubber (modified isoprene-based rubber) having a phosphorous content of 200 ppm or less, and more preferably an NR (HPNR: Highly Purified Natural Rubber) having a phosphorous content of 200 ppm or less. Since the modified isoprene-based rubber is free from honeycomb cells formed from proteins and phospholipids, the modified isoprene-based rubber has the properties that it can easily incorporate filler and has high compatibility with other polymers. Thus, the masterbatch prepared from the modified isoprene-based rubber enables the preparation of a rubber composition in which microfibrillated plant fibers are uniformly dispersed.

The phosphorous content can be measured by a conventional method such as ICP optical emission spectrometry. The phosphorus is derived from phospholipids (phosphorous compounds).

The modified isoprene-based rubber preferably has a nitrogen content of 0.4% by mass or less, more preferably 0.3% by mass or less, and further preferably 0.15% by mass or less. If the nitrogen content is more than 0.4% by mass, the Mooney viscosity tends to be increased during storage so that the processability may be deteriorated. In addition, the fuel economy may be deteriorated.

The nitrogen content can be measured by a conventional method such as Kjeldahl method. The nitrogen is derived from proteins.

The masterbatch containing the modified isoprene-based rubber may be prepared by: performing a saponification treatment on an isoprene-based rubber latex to prepare a saponified isoprene-based rubber latex; mixing the saponified isoprene-based rubber latex and the microfibrillated plant fiber solution, and optionally a cationic polymer to prepare a compounded latex (liquid mixture), coagulating the compounded latex, and then discarding the liquid phase in the step (II); and washing the resultant coagulum to reduce the phosphorous content in the isoprene-based rubber in the step (III). In this method, the microfibrillated plant fiber solution is added after the saponification treatment. This weakens the alkalinity, suppressing damage on the microfibrillated plant fibers.

The saponification treatment of an isoprene-based rubber latex may be performed by adding a strong alkali such as NaOH and optionally a surfactant to an isoprene-based rubber latex and leaving the resultant mixture at rest for a certain period of time at a predetermined temperature. Stirring and the like may be performed, if necessary. The saponification treatment of an isoprene-based rubber in a latex state is efficient since it enables the particles of the isoprene-based rubber to be uniformly treated. When the saponification treatment is performed, phosphorous compounds separated from the rubber in the saponification can then be removed by washing in the step (III). Thus, the phosphorous content in the isoprene-based rubber in the masterbatch to be prepared can be reduced. Since the saponification treatment also enables separation of proteins from the isoprene-based rubber, the nitrogen content in the latex can also be reduced by washing.

The alkali used in the saponification treatment is preferably sodium hydroxide, potassium hydroxide, or the like. The surfactant is not particularly limited and examples thereof include known nonionic, anionic, and amphoteric surfactants such as polyoxyethylene alkyl ether sulfate salts. Polyoxyethylene alkyl ether sulfate salts are suitable from the viewpoint of satisfactory saponification of rubber without coagulation. In the saponification treatment, the amounts of the alkali and surfactant, and the temperature and time of the saponification treatment may be set as appropriate.

<Rubber Composition>

The rubber composition of the present invention can be prepared as follows: filler and the like are added to the masterbatch and they are kneaded; sulfur, a vulcanization accelerator, and the like are added to the resultant kneaded mixture and they are kneaded; and the resultant unvulcanized rubber composition is vulcanized.

The rubber composition of the present invention may contain other rubber component(s) in addition to the rubber component contained in the masterbatch. The other rubber component(s) is preferably at least one diene rubber selected from the group consisting of natural rubber (NR), isoprene rubber (IR), epoxidized natural rubber (ENR), butadiene rubber (BR), and styrene-butadiene rubber (SBR). More preferred are NR and BR.

The NR content based on 100% by mass of total rubber component (a total of the rubber component in the masterbatch and other rubber components) in the rubber composition of the present invention is preferably 15% by mass or more, and preferably 35% by mass or more. If the NR content is less than 15% by mass, the elongation at break may be insufficient. The NR content may be 100% by mass, and is preferably 80% by mass or less, and more preferably 60% by mass or less. An NR content of more than 80% by mass may lead to reduction in crack growth resistance and reversion resistance.

The BR content based on 100% by mass of total rubber component in the rubber composition of the present invention may be 0% by mass, and is preferably 20% by mass or more, and more preferably 40% by mass or more. If the BR content is less than 20% by mass, the crack growth resistance and abrasion resistance may be reduced. The BR content is preferably 85% by mass or less, and more preferably 65% by mass or less. A BR content of more than 85% by mass may lead to insufficient fuel economy.

The amount of microfibrillated plant fibers per 100 parts by mass of total rubber component in the rubber composition of the present invention is preferably 0.1 parts by mass or more, more preferably 1 part by mass or more, further preferably 2 parts by mass or more, and particularly preferably 3 parts by mass or more. If the amount of the fibers is less than 0.1 parts by mass, the interaction of the microfibrillated plant fibers is less likely to take place, and therefore a high complex modulus E* may not be obtained. The amount of microfibrillated plant fibers is preferably 20 parts by mass or less, more preferably 15 parts by mass or less, and further preferably 12 parts by mass or less. If the amount of microfibrillated plant fibers is more than 20 parts by mass, the fibers are less likely to disperse, and therefore the elongation at break and fuel economy may be deteriorated.

The rubber composition of the present invention preferably contains carbon black. The use of carbon black enables proper reinforcement in every direction of the tire and therefore balanced improvement of hardness, crack growth resistance, and elongation at break.

The nitrogen adsorption specific surface area ($N_2SA$) of carbon black is preferably 15 $m^2/g$ or larger, and more preferably 25 $m^2/g$ or larger. If the $N_2SA$ is smaller than 15 $m^2/g$, the elongation at break may be insufficient. In the case of using the rubber composition of the present invention in a tread, in which abrasion resistance has most importance, the $N_2SA$ of carbon black is preferably 200 $m^2/g$ or smaller, and more preferably 180 $m^2/g$ or smaller. If the $N_2SA$ is larger than 200 $m^2/g$, the dispersibility and fuel economy may be insufficient. In the case of using the rubber composition of the present invention in a component other than the tread, specifically in inner casing compounding, the $N_2SA$ of carbon black is preferably 100 $m^2/g$ or smaller, and more preferably 80 $m^2/g$ or smaller. Here, the $N_2SA$ of carbon black can be determined in conformity with JIS K 6217-2:2001.

The amount of carbon black per 100 parts by mass of total rubber component is preferably 30 parts by mass or more, and more preferably 50 parts by mass or more. The amount of carbon black is preferably 100 parts by mass or less, and more preferably 80 parts by mass or less. When the amount is in such a range, the handling stability, ride comfort, elongation at break, abrasion resistance (in the case of a tread and clinch apex), and compounding costs can be improved in a balanced manner.

The rubber composition of the present invention preferably contains a petroleum resin. The use of a petroleum resin can provide favorable building processability including tackiness between assembled rubber compounds. Suitable examples of the petroleum resin include copolymerized petroleum resins prepared by polymerizing C5 fraction (aliphatic fraction) and C9 fraction (aromatic fraction), which are obtained by naphtha cracking.

The petroleum resin preferably has a softening point of 50° C. or higher, more preferably 80° C. or higher. The softening point is also preferably 150° C. or lower, and more preferably 120° C. or lower. A softening point in such a range leads to favorable adhesion and elongation at break.

Here, the softening point herein means the softening point defined in JIS K 6220 and is a temperature at which a ball falls in the measurement using a ring and ball softening point measuring apparatus.

The amount of the petroleum resin per 100 parts by mass of total rubber component is preferably 0.1 parts by mass or more, and more preferably 0.5 parts by mass or more. The amount of the petroleum resin is preferably 5 parts by mass or less, and more preferably 3 parts by mass or less. The use of the petroleum resin in such a range provides favorable adhesion and elongation at break.

The rubber composition of the present invention may optionally contain, in addition to the above components, compounding ingredients conventionally used in the rubber industry, such as oil, zinc oxide, stearic acid, various antioxidants, sulfur, and vulcanization accelerators.

The antioxidant is not particularly limited, and may be any used in the rubber industry. Examples thereof include phenylenediamine, quinoline, quinone, and phenol antioxidants. Preferred among these are phenylenediamine antioxidants and quinoline antioxidants. Combination use of phenylenediamine and quinoline antioxidants is more preferred. Examples of the phenylenediamine antioxidant include N-phenyl-N'-(1,3-dimethylbutyl)-p-phenylenediamine, N-isopropyl-N'-phenyl-p-phenylenediamine, and N,N'-diphenyl-p-phenylenediamine. N-phenyl-N'-(1,3-dimethylbutyl)-p-phenylenediamine may be suitably used. Examples of the quinoline antioxidant include 2,2,4-trimethyl-1,2-dihydroquinoline polymer and 6-ethoxy-2,2,4-trimethyl-1,2- dihydroquinoline. 2,2,4-trimethyl-1,2-dihydroquinoline polymer may be suitably used.

The amount of the antioxidant (the total amount of the antioxidant in the masterbatch and other antioxidants) per 100 parts by mass of total rubber component is preferably 1 part by mass or more, and more preferably 3 parts by mass or more. The amount of the antioxidant is preferably 10 parts by mass or less, and more preferably 8 parts by mass or less.

The rubber composition of the present invention preferably has a ratio ($E^*a/E^*b$) of a complex modulus $E^*a$ in an extrusion direction (or in the tire circumferential direction) to a complex modulus $E^*b$ in a perpendicular direction to the extrusion direction (or in the tire radial direction) of 1.05 to 6.00, where the complex modulus $E^*a$ and the complex modulus $E^*b$ are each measured at a temperature of 70° C. and a dynamic strain of 2%. Setting the ratio $E^*a/E^*b$ in that range contributes to a better balance of handling stability, ride comfort, and crack growth resistance. The ratio $E^*a/E^*b$ is more preferably 2.00 to 6.00, and further preferably 3.00 to 6.00.

Figure 1:
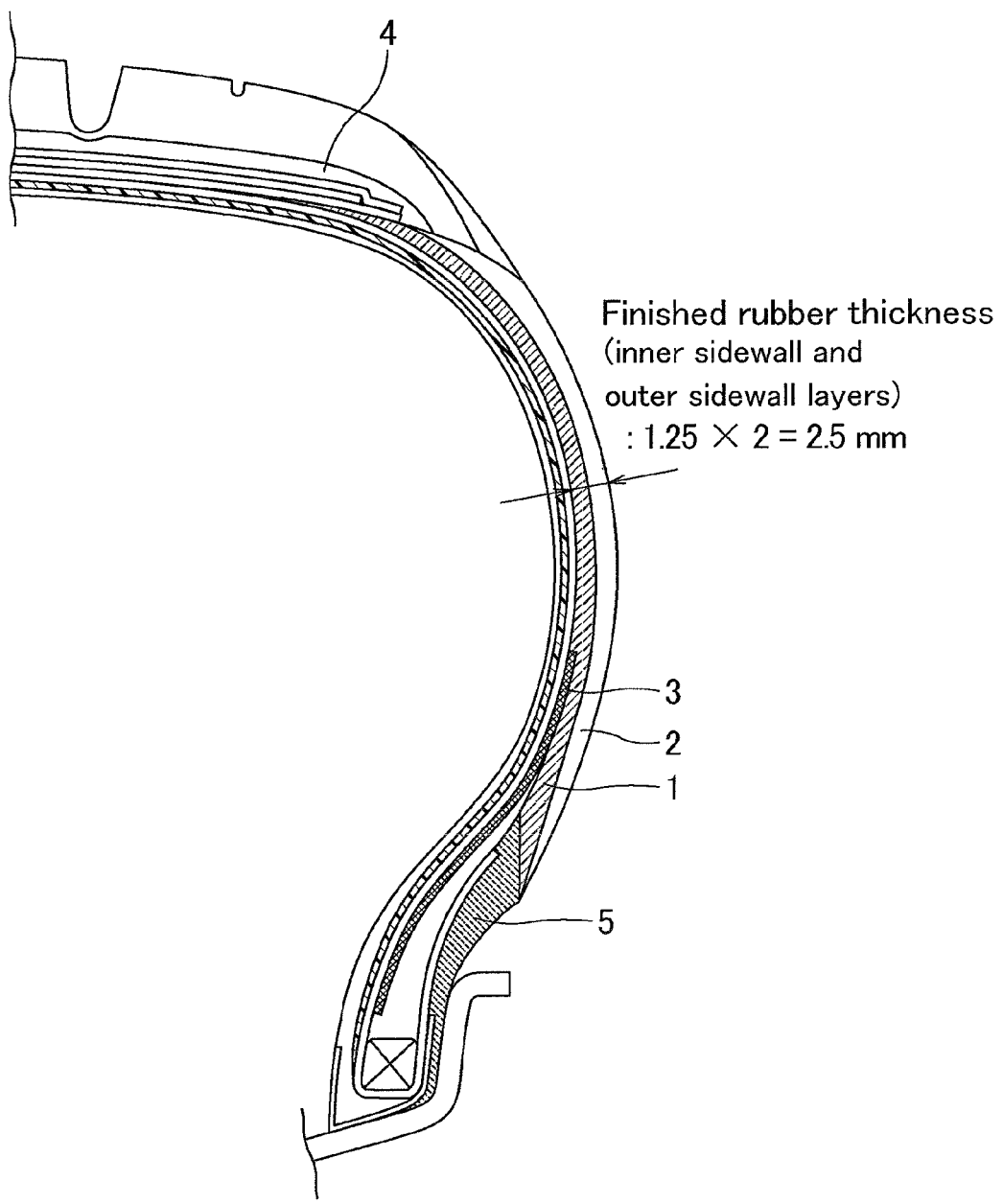
FIG. 1 is a schematic cross-sectional view of each of test tires of examples and comparative examples. The test tires include a two-layer sidewall.

The tire circumferential direction and the tire radial direction herein specifically refer to the directions shown in, for example, FIG. 1 of JP 2009-202865 A (which is incorporated by reference in the entirety).

The $E^*a$ and $E^*b$ herein are measured according to the methods mentioned later in examples.

The ratio $E^*a/E^*b$ can be adjusted by adjusting the length, the amount, the flexibility, and the degree of disintegration of microfibrillated plant fibers, the extrusion pressure of the unvulcanized rubber composition, and the like. Specifically, the ratio $E^*a/E^*b$ increases as the microfibrillated plant fibers having a mean fiber length of 10 to 150 μm are oriented in the tire circumferential direction at more even intervals. The ratio also increases as a larger amount of microfibrillated plant fibers are used.

The ratio $E^*a/E^*b$ can also be enhanced by conventional techniques such as by using SPB (1,2-syndiotactic polybutadiene crystal)-containing BR (e.g. VCR617, a product of Ube Industries, Ltd.); by increasing the amount of the cross-linking agent; by using a phenol resin and HMT in combination; or by increasing the amount of carbon black. However, the use of microfibrillated plant fibers is more effective in enhancing the ratio $E^*a/E^*b$ compared to the conventional techniques. In particular, the use of microfibrillated plant fibers can achieve a ratio $E^*a/E^*b$ of 3.00 or larger without impairing the elongation at break and durability, whereas the conventional techniques have great difficulties in achieving it.

The complex modulus $E^*a$ is preferably 8 to 20 in terms of achieving favorable handling stability. The complex modulus $E^*b$ is preferably 3 to 20 in terms of achieving favorable ride comfort and fuel economy.

The method for preparing the rubber composition of the present invention may be any known method such as by kneading components mentioned above with a rubber kneading device such as an open roll mill or Banbury mixer, and then vulcanizing the kneaded mixture.

The rubber composition of the present invention can be used for tire components, and suitably used for treads, sidewalls, inner sidewall layers, breaker cushions, base treads, tie gums, bead apexes, clinch apexes, strip apexes, and breaker edge strips.

The inner sidewall layer is an inner layer of a multilayer sidewall; specifically, it is a component shown in, for example, FIG. 1 of JP 2007-106166 A (which is incorporated by reference in the entirety).

The breaker cushion is a component disposed between the edge of a breaker and a carcass (case); specifically, it is a component shown in, for example, FIG. 1 of JP 2006-273934 A (which is incorporated by reference in the entirety).

The base tread is an inner layer of a multilayer tread. In a tread consisting of two layers [an outer surface layer (cap tread) and an inner surface layer (base tread)], the base tread corresponds to the inner surface layer.

The tie gum is a component disposed between a carcass cord and an inner liner; specifically, it is a component shown in, for example, FIG. 1 of JP 2010-095705 A (which is incorporated by reference in the entirety).

Figure 2:
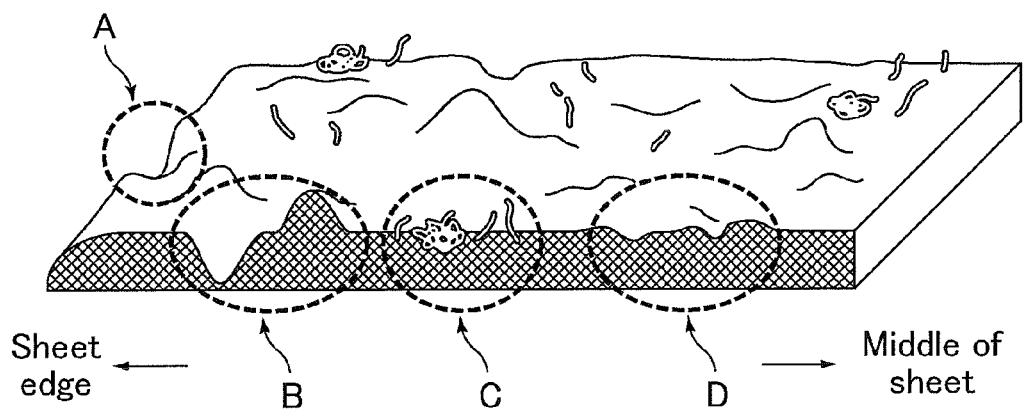
FIG. 2 is a schematic view of a sheet used in the evaluation of sheet processability.

The bead apex is a triangular component extending radially from the upper part of a bead core to approximately a maximum width position of the tire; specifically, it is a component shown in, for example, FIGS. 1 to 3 of JP 2008-38140 A (which is incorporated by reference in the entirety).

The strip apex is an inner rubber layer for reinforcing the sidewall portion; specifically, it is a component shown in, for example, FIG. 1 of JP 2010-149677 A and FIG. 5 of JP 2008-038140 A (which are incorporated by reference in their entirety).

The breaker edge strip is a component disposed on the edge of a breaker; specifically, it is a component shown in, for example, FIGS. 2 to 4 of JP 2012-87253 A (which is incorporated by reference in the entirety).

The pneumatic tire of the present invention can be formed from the rubber composition by a usual method. Specifically, the rubber composition before vulcanization is extruded and processed into the shape of a tire component such as a sidewall, and arranged in a usual manner and assembled with other tire components in a tire building machine to form an unvulcanized tire. This unvulcanized tire is heat-pressurized in a vulcanizer, whereby a tire can be produced.

EXAMPLES

Hereinafter, the present invention will be described in more detail with reference to examples. The examples are not intended to limit the scope of the present invention.

The chemicals used in the preparation of masterbatches are listed below.

Natural rubber latex: field latex available from Muhibbah LATEKS Sdn. Bhd.

NEOFIBER: NEOFIBER (Oji Seitai Kaisha, Ltd.) (microfibrillated plant fibers)

Surfactant: Emal-E (sodium polyoxyethylene lauryl ether sulfate) (KAO Corp.)

NaOH: NaOH (Wako Pure Chemical Industries, Ltd.)

Antioxidant: Wingstay L (Eliokem) (t-butylated condensate of p-cresol and dicyclopentadiene)

Flocculant: C-303H (strong cation) (MT AquaPolymer Inc.)

Coagulant: 1% sulfuric acid (Wako Pure Chemical Industries, Ltd.)

(Preparation of Microfibrillated Plant Fiber Solution)

Microfibrillated plant fibers were diluted with water by a factor of 200 (in mass ratio). The diluted fibers were stirred with a homogenizer. In this way, microfibrillated plant fiber solutions in which the amount of microfibrillated plant fibers (hereinafter, also referred to as solution concentration) was set to 0.5 to 2.5% by mass were prepared. In the preparation, the degree of disintegration of microfibrillated plant fibers was adjusted by altering the stirring time and the type of homogenizer.

(Analysis of Microfibrillated Plant Fiber Solution)

The viscosity of the microfibrillated plant fiber solution (hereinafter, also referred to as solution viscosity) was measured at ordinary temperature (23° C.) with a tuning-fork vibration viscometer (SV-10, a product of A&D Company, Ltd.).

The mean fiber length (volume average length (hereinafter, also referred to as fiber length)) of the microfibrillated plant fibers in the microfibrillated plant fiber solution was measured at ordinary temperature (23° C.) with a laser diffraction/scattering particle size distribution measuring apparatus (LA-910, a product of Horiba, Ltd.).

Figure 6:
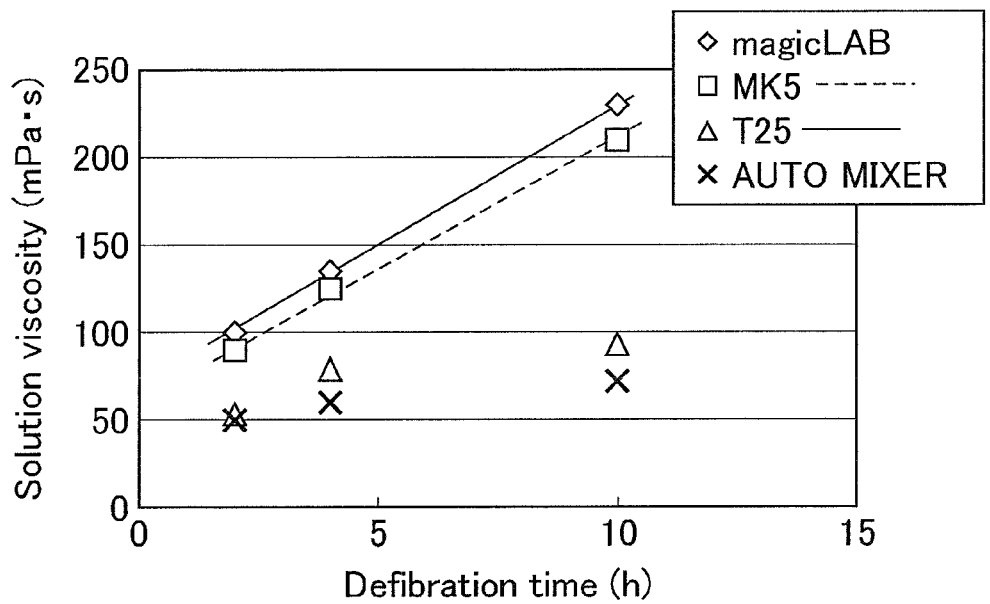
FIG. 6 is a graph showing the correlation of defibration time and solution viscosity.
Figure 7:
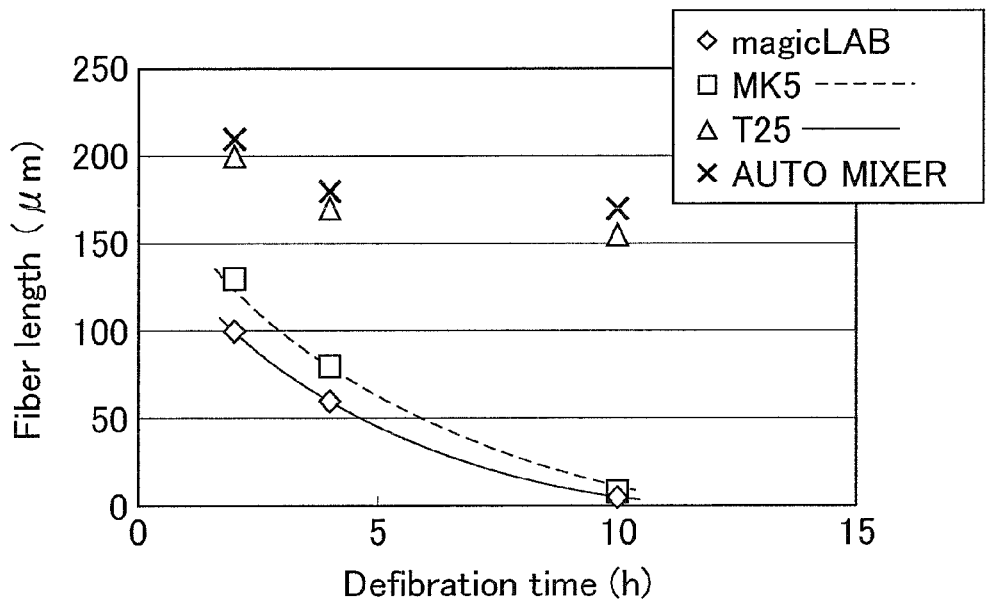
FIG. 7 is a graph showing the correlation of defibration time and fiber length.

Table 1 shows the measurement results. FIG. 6 shows the correlation of the defibration time and the solution viscosity, and FIG. 7 shows the correlation of the defibration time and the fiber length. Here, FIGS. 6 and 7 only show data at a solution concentration of 1% by mass.

(Preparation of Masterbatch)

The solids concentration (DRC) in a natural rubber latex was adjusted to 30% (w/v). Then, a surfactant (10 g) and NaOH (20 g) were added to the natural rubber latex (1,000 g), and the mixture was saponified for 48 hours at room temperature, whereby a saponified natural rubber latex was obtained.

To the saponified natural rubber latex was added an antioxidant (5 g).

Next, the saponified natural rubber latex and the microfibrillated plant fiber solution were weighed and adjusted so that the mass ratio therebetween after drying was set as shown in Table 1, and they were stirred at 300 rpm for a period of time shown in Table 1 with a stirring device.

A flocculant shown in Table 1 was then added to the resultant mixture, and the mixture was stirred for two minutes at 300 rpm with the stirring device. The amount of the flocculant shown in Table 1 is given per 100 parts by mass of the rubber component of the saponified natural rubber latex used.

Then, a coagulant was added in stages to the resultant mixture under stirring at 300 rpm and at 30° C. to 35° C. with the stirring device so that the pH was adjusted to 4 to 7 to provide a coagulum. The stirring time was one hour. The obtained coagulum was repeatedly washed with water (1000 ml).

Thereafter, the coagulum was air-dried for several hours and further vacuum-dried for 12 hours at 40° C. to give a masterbatch (MB). Table 1 shows the information of MB1 to MB24 obtained as above. Here, MB19 and MB20 were prepared without saponification treatment.

The nitrogen content and phosphorous content of the rubber component were measured for each of MB1 to MB24 by the methods described below. Also, the pH was measured for each of MB1 to MB24 with a pH meter D-24 (a product of Horiba, Ltd.). The productivity was also evaluated for each of MB1 to MB24 by the method described below. Table 1 shows the results.

(Determination of Nitrogen Content)

The nitrogen content was determined by gas chromatography after pyrolysis.

(Determination of Phosphorous Content)

The phosphorous content was determined using an ICP optical emission spectrometer (P-4010, a product of Hitachi, Ltd.)

(Productivity)

(1) The amount of time required to make microfibrillated plant fibers in water with a homogenizer to provide a predetermined solution viscosity (homogenizing time)

(2) The amount of time required for the solids in a mixture of a microfibrillated plant fiber solution prepared in the process (1) and a rubber latex to precipitate to cause a solid-liquid phase separation (3) The amount of time required for about 100% of the microfibrillated plant fibers in the liquid phase to be completely incorporated into the solids derived mainly from the latex The total of the amounts of time (1) to (3) was determined for MBs and expressed as an index relative to that of MB1 (=100). A greater index value indicates a smaller total amount of (1) to (3) and better workability. An acceptable level is 50 or greater in index.

TABLE 1

| | Rubber | Fibers | Amount of fibers phr | Amount of flocculant phr | Homogenizer (manufacturer) | |
|---|---|---|---|---|---|---|
| MB1 | NR | NEOFIBER | 20 | 0.5 | magic LAB (IKA) | circulation type |
| MB2 | NR | NEOFIBER | 20 | 0.5 | magic LAB (IKA) | circulation type |
| MB3 | NR | NEOFIBER | 20 | 0.5 | magic LAB (IKA) | circulation type |
| MB4 | NR | NEOFIBER | 20 | 0.008 | magic LAB (IKA) | circulation type |
| MB5 | NR | NEOFIBER | 20 | 0.1 | magic LAB (IKA) | circulation type |
| MB6 | NR | NEOFIBER | 20 | 1.0 | magic LAB (IKA) | circulation type |
| MB7 | NR | NEOFIBER | 20 | 2.0 | magic LAB (IKA) | circulation type |
| MB8 | NR | NEOFIBER | 20 | 2.5 | magic LAB (IKA) | circulation type |
| MB9 | NR | NEOFIBER | 20 | 0.5 | MK2000/05 (IKA) | circulation type |
| MB10 | NR | NEOFIBER | 20 | 0.5 | MK2000/05 (IKA) | circulation type |
| MB11 | NR | NEOFIBER | 20 | 0.5 | MK2000/05 (IKA) | circulation type |
| MB12 | NR | NEOFIBER | 20 | 0.5 | T25(IKA) | cylinder type |
| MB13 | NR | NEOFIBER | 20 | 0.5 | T25(IKA) | cylinder type |
| MB14 | NR | NEOFIBER | 20 | 0.5 | T25(IKA) | cylinder type |
| MB15 | NR | NEOFIBER | 20 | 0.5 | AUTO MIXER Model 20 (primix) | cylinder type |
| MB16 | NR | NEOFIBER | 20 | 0.5 | AUTO MIXER Model 20 (primix) | cylinder type |
| MB17 | NR | NEOFIBER | 20 | 0.5 | AUTO MIXER Model 20 (primix) | cylinder type |
| MB18 | NR | NEOFIBER | 30 | 0.5 | magic LAB (IKA) | circulation type |
| MB19 | NR | NEOFIBER | 20 | 0.5 | magic LAB (IKA) | circulation type |
| MB20 | NR | NEOFIBER | 20 | 0.5 | magic LAB (IKA) | circulation type |
| MB21 | NR | NEOFIBER | 20 | 0.5 | magic LAB (IKA) | circulation type |
| MB22 | NR | NEOFIBER | 20 | 0.5 | magic LAB (IKA) | circulation type |
| MB23 | NR | NEOFIBER | 20 | 0.5 | magic LAB (IKA) | circulation type |
| MB24 | NR | NEOFIBER | 20 | 0.5 | three units of magic LAB (IKA) | continuous |

TABLE 1-continued

|  | Defibration time h | Solution concentration mass % | Solution viscosity mPa·s | Fiber length μm | Nitrogen content % | Phosphorous content ppm | pH | Productivity |
|---|---|---|---|---|---|---|---|---|
| MB1 | 2 | 1 | 100 | 100 | 0.08 | 100 | 5.2 | 100 |
| MB2 | 4 | 1 | 135 | 60 | 0.08 | 102 | 5.0 | 90 |
| MB3 | 10 | 1 | 230 | 5 | 0.09 | 101 | 4.9 | 20 |
| MB4 | 4 | 1 | 135 | 60 | 0.08 | 103 | 4.9 | 50 |
| MB5 | 4 | 1 | 135 | 60 | 0.09 | 98 | 5.0 | 60 |
| MB6 | 4 | 1 | 135 | 60 | 0.10 | 102 | 5.1 | 90 |
| MB7 | 4 | 1 | 135 | 60 | 0.08 | 99 | 5.0 | 90 |
| MB8 | 4 | 1 | 135 | 60 | 0.01 | 99 | 4.9 | 90 |
| MB9 | 2 | 1 | 90 | 130 | 0.09 | 100 | 5.1 | 100 |
| MB10 | 4 | 1 | 125 | 80 | 0.08 | 100 | 5.0 | 90 |
| MB11 | 10 | 1 | 210 | 8 | 0.09 | 102 | 5.1 | 30 |
| MB12 | 2 | 1 | 53 | 200 | 0.10 | 103 | 5.1 | 80 |
| MB13 | 4 | 1 | 79 | 170 | 0.10 | 101 | 4.9 | 70 |
| MB14 | 10 | 1 | 93 | 155 | 0.08 | 102 | 4.8 | 30 |
| MB15 | 2 | 1 | 50 | 210 | 0.08 | 100 | 4.9 | 90 |
| MB16 | 4 | 1 | 60 | 180 | 0.09 | 103 | 5.3 | 70 |
| MB17 | 10 | 1 | 72 | 170 | 0.10 | 102 | 5.3 | 40 |
| MB18 | 4 | 1 | 135 | 60 | 0.09 | 101 | 5.1 | 75 |
| MB19 | 4 | 1 | 135 | 60 | 0.32 | 190 | 5.0 | 75 |
| MB20 | 4 | 1 | 135 | 60 | 0.38 | 430 | 5.1 | 55 |
| MB21 | 4 | 0.5 | 105 | 90 | 0.10 | 102 | 5.1 | 90 |
| MB22 | 2 | 1.7 | 125 | 75 | 0.09 | 100 | 5.0 | 100 |
| MB23 | 2 | 2.5 | 180 | 20 | 0.10 | 101 | 5.2 | 40 |
| MB24 | 0.5 | 1 | 130 | 65 | 0.09 | 100 | 5.1 | 130 |

The chemicals used in examples were listed below.
NR: TSR20
BR: BR150B (Ube Industries., Ltd.)
MBs: prepared by the above methods
Microfibrillated plant fibers: NEOFIBER (Oji Seitai Kaisha, Ltd.)
Carbon black: SHOBLACK N660 ($N_2SA$: 30 $m^2/g$) (Cabot Japan K.K.)
Petroleum resin: Petrotack 100 V (Tosoh Corp.)
Antioxidant 6C: ANTIGENE 6C (N-phenyl-N'-(1,3-dimethylbutyl)-p-phenylenediamine) (Sumitomo Chemical Co. Ltd.)
Antioxidant RD: NOCRAC 224 (2,2,4-trimethyl-1,2-dihydroquinoline polymer) (Ouchi Shinko Chemical Industrial Co., Ltd.)
Zinc oxide: Ginrei R (Toho Zinc Co., Ltd.)
Wax: OZOACE 0355 (Nippon Seiro Co., Ltd.)
Stearic acid:stearic acid "TSUBAKI" (NOF Corporation)
Oil: Diana Process NH-70S (Idemitsu Kosan Co., Ltd.)
Sulfur: sulfur powder (Tsurumi Chemical Industry Co., Ltd.)
Vulcanization accelerator NS: NOCCELER NS (N-tert-butyl-2-benzothiazolylsulphenamide) (Ouchi Shinko Chemical Industrial Co., Ltd.)

Examples and Comparative Examples

According to each recipe shown in the upper part of Table 2, chemicals other than sulfur and a vulcanization accelerator were kneaded for 4 minutes with a 1.7-L Banbury mixer (a product of Kobe Steel, Ltd.). The kneaded mixture was discharged at 105° C. Subsequently, the sulfur and vulcanization accelerator were added to the kneaded mixture, and they were kneaded with an open roll mill to provide an unvulcanized rubber composition for an inner sidewall layer.

The resultant unvulcanized rubber composition for an inner sidewall layer was extruded together with an unvulcanized rubber composition for an outer sidewall layer and an unvulcanized rubber composition for a clinch apex in a three-layer cold feed extruder. The extrudate was assembled with other tire components in a tire building machine to provide a raw tire. The raw tire was vulcanized at 170° C. for 12 minutes to provide a test tire (205/65R15). FIG. 1 shows a schematic cross-sectional view of the obtained test tire.

(Viscoelasticity Test 1)

A strip-shaped rubber test piece was cut out of the obtained test tire such that the long side of the test piece was along the circumferential direction about the tire axis, to prepare a rubber test piece 1 (size: 20 mm in length, 3 mm in width, and 2 mm in thickness). Furthermore, another strip-shaped rubber test piece was cut out such that the long side of the test piece was along the radial direction about the tire axis, to prepare a rubber test piece 2 (size: the same as that of the rubber test piece 1).

With respect to the obtained rubber test pieces 1 and 2, the complex modulus $E^*a$ (MPa) in the tire circumferential direction and the complex modulus $E^*b$ (MPa) in the tire radial direction were measured at a temperature of 70° C., a frequency of 10 Hz, an initial strain of 10%, and a dynamic strain of 2% (strain in the long-side direction) using a viscoelastic spectrometer VES (Iwamoto Seisakusho Co., Ltd.). A greater $E^*$ value indicates higher rigidity.

Here, an $E^*a$ value in the targeted range indicates better steering response and better handling stability. A ratio $E^*a/E^*b$ in the targeted range indicates a better transient characteristic (easier returning of a vehicle when the steering wheel is returned to the straight-ahead position immediately after cornering with a certain steering angle).

In addition, the tan δ of the rubber test piece 1 was measured by the above evaluation method. A smaller value of tan δ (at 70° C.) indicates better fuel economy.

(Tensile Test)

A No. 3 dumbbell specimen from the rubber test piece 1 was subjected to a tensile test at ordinary temperature according to JIS K 6251 2010 "rubber, vulcanized or thermoplastic—Determination of tensile stress-strain properties", and the elongation at break EB (%) of the specimen was measured. A greater elongation at break EB (%) indicates better durability.

(Sheet processability)

Each of the unvulcanized rubber compositions was extruded and then shaped into a sheet having a thickness of 1.0 mm. The shaped products were visually or tactually evaluated for the edge conditions, compound scorch, the degree of adhesion between rubber products, the flatness, and the presence of agglomerates or protrusions of microfibrillated plant fibers. The results of Comparative Example 1 were regarded as 100, and the results of each composition were expressed as an index. A greater index value indicates better sheet processability.

With respect to the edge conditions, the straight and smooth edges were evaluated as good. With respect to compound scorch, the absence of irregularities due to cured bits on a 15-cm-square, 2-mm-thick sheet cut out of the shaped product was evaluated as good. With respect to the flatness, the sheet that was flat enough to adhere tightly to a flat plate was evaluated as good. The presence of agglomerates or protrusions of microfibrillated plant fibers was visually evaluated relative to a reference level: 0.1 agglomerates/cm$^2$ (10 agglomerates/100 cm$^2$) on a cross-section of the rubber sheet. FIG. 2 shows a schematic view of the sheet. In FIG. 2, the region A has unfavorable edge conditions (a recessed edge portion); the region B has irregularities due to cured bits; the region C has agglomerates and protrusions of microfibrillated plant fibers; and the region D is unfavorable in terms of flatness.

(Handling Stability, Ride Comfort)

All the wheels of a vehicle (engine size: 3,000 cc) were equipped with the test tires (205/65R15), and the vehicle was driven on a test course under standard driving conditions. The control stability during steering (handling stability) and the ride comfort were sensory evaluated by a test driver. The results of Comparative Example 1 were regarded as 100, and the results of each example were expressed in index values. A greater index value of handling stability indicates better handling stability, and a greater index value of ride comfort indicates better ride comfort.

TABLE 2

|  |  |  | Comparative Examples |  |  |  |  |  |  | Examples |  |  |
|---|---|---|---|---|---|---|---|---|---|---|---|---|
|  |  |  | 1 | 2 | 3 | 4 | 5 | 6 | 7 | 1 | 2 | 3 |
| MB added |  |  | — | — | MB3 | MB13 | MB16 | MB16 | MB23 | MB2 | MB6 | MB7 |
| Fiber length (μm) |  |  | — | — | 5 | 170 | 180 | 180 | 20 | 60 | 60 | 60 |
| Formulation | NR |  | 42 | 42 | 17 | 17 | 17 | 4.5 | 17 | 17 | 17 | 17 |
| (part(s) | BR |  | 58 | 58 | 58 | 58 | 58 | 58 | 58 | 58 | 58 | 58 |
| by mass) | MB |  | — | — | 30 | 30 | 30 | 45 | 30 | 30 | 30 | 30 |
|  | Rubber content |  | — | — | 25 | 25 | 25 | 37.5 | 25 | 25 | 25 | 25 |
|  | Fiber content |  | — | — | 5 | 5 | 5 | 7.5 | 5 | 5 | 5 | 5 |
|  | Microfibrillated plant fibers |  | — | 5 | — | — | — | — | — | — | — | — |
|  | Carbon black |  | 70 | 70 | 70 | 70 | 70 | 70 | 70 | 70 | 70 | 70 |
|  | Petroleum resin |  | 1 | 1 | 1 | 1 | 1 | 1 | 1 | 1 | 1 | 1 |
|  | Antioxidant 6C |  | 4 | 4 | 4 | 4 | 4 | 4 | 4 | 4 | 4 | 4 |
|  | Antioxidant RD |  | 0.5 | 0.5 | 0.5 | 0.5 | 0.5 | 0.5 | 0.5 | 0.5 | 0.5 | 0.5 |
|  | Zinc oxide |  | 2.5 | 2.5 | 2.5 | 2.5 | 2.5 | 2.5 | 2.5 | 2.5 | 2.5 | 2.5 |
|  | Wax |  | 1.3 | 1.3 | 1.3 | 1.3 | 1.3 | 1.3 | 1.3 | 1.3 | 1.3 | 1.3 |
|  | Stearic acid |  | 2 | 2 | 2 | 2 | 2 | 2 | 2 | 2 | 2 | 2 |
|  | Oil |  | 16.5 | 16.5 | 16.5 | 16.5 | 16.5 | 16.5 | 16.5 | 16.5 | 16.5 | 16.5 |
|  | Sulfur |  | 1.5 | 1.5 | 1.5 | 1.5 | 1.5 | 1.5 | 1.5 | 1.5 | 1.5 | 1.5 |
|  | Vulcanization accelerator NS |  | 0.7 | 0.7 | 0.7 | 0.7 | 0.7 | 0.7 | 0.7 | 0.7 | 0.7 | 0.7 |
|  |  | Target value |  |  |  |  |  |  |  |  |  |  |
| Evaluation | E*a in tire circumferential direction (at 70° C.) | 8 to 20 | 3.4 | 6.2 | 7.5 | 7.3 | 7.2 | 9.5 | 10.1 | 15.5 | 14.5 | 14.0 |
|  | E*b in tire radial direction (at 70° C.) |  | 3.2 | 3.5 | 4.3 | 3.1 | 3.1 | 3.4 | 3.8 | 3.7 | 3.6 | 3.7 |
|  | Ratio between E*a and E*b (%) | 1.05 to 6 | 1.1 | 1.8 | 1.7 | 2.4 | 2.3 | 2.8 | 2.7 | 4.2 | 4.0 | 3.8 |
|  | tanδ (at 70° C.) in circumferential direction | <0.200 | 0.180 | 0.205 | 0.183 | 0.185 | 0.186 | 0.191 | 0.235 | 0.183 | 0.185 | 0.191 |
|  | Elongation at break EB (%) in circumferential direction | >400 | 580 | 250 | 410 | 380 | 390 | 360 | 305 | 490 | 500 | 480 |
|  | Sheet processability index | ≥90 | 100 | 60 | 85 | 60 | 60 | 55 | 70 | 100 | 100 | 95 |
|  | Handling stability index | ≥110 | 100 | 106 | 110 | 110 | 110 | 115 | 115 | 135 | 110 | 110 |
|  | Ride comfort index | ≥90 | 100 | 95 | 80 | 100 | 100 | 95 | 90 | 90 | 90 | 90 |

|  |  | Examples |  |  |  |  |  |  |  |  |  |
|---|---|---|---|---|---|---|---|---|---|---|---|
|  |  | 4 | 5 | 6 | 7 | 8 | 9 | 10 | 11 | 12 | 13 |
| MB added |  | MB8 | MB10 | MB2 | MB2 | MB18 | MB19 | MB20 | MB21 | MB22 | MB24 |
| Fiber length (μm) |  | 60 | 80 | 60 | 60 | 60 | 60 | 60 | 90 | 75 | 65 |
| Formulation | NR | 17 | 17 | 32 | — | 17 | 17 | 17 | 17 | 17 | 17 |
| (part(s) | BR | 58 | 58 | 58 | — | 58 | 58 | 58 | 58 | 58 | 58 |
| by mass) | MB | 30 | 30 | 12 | 120 | 30 | 30 | 30 | 30 | 30 | 30 |
|  | Rubber content | 25 | 25 | 10 | 100 | 25 | 25 | 25 | 25 | 25 | 25 |

TABLE 2-continued

| | | | | | | | | | | | |
|---|---|---|---|---|---|---|---|---|---|---|---|
| | Fiber content | | 5 | 5 | 2 | 20 | 5 | 5 | 5 | 5 | 5 | 5 |
| | Microfibrillated plant fibers | | — | — | — | — | — | — | — | — | — | — |
| | Carbon black | | 70 | 70 | 70 | 70 | 70 | 70 | 70 | 70 | 70 | 70 |
| | Petroleum resin | | 1 | 1 | 1 | 1 | 1 | 1 | 1 | 1 | 1 | 1 |
| | Antioxidant 6C | | 4 | 4 | 4 | 4 | 4 | 4 | 4 | 4 | 4 | 4 |
| | Antioxidant RD | | 0.5 | 0.5 | 0.5 | 0.5 | 0.5 | 0.5 | 0.5 | 0.5 | 0.5 | 0.5 |
| | Zinc oxide | | 2.5 | 2.5 | 2.5 | 2.5 | 2.5 | 2.5 | 2.5 | 2.5 | 2.5 | 2.5 |
| | Wax | | 1.3 | 1.3 | 1.3 | 1.3 | 1.3 | 1.3 | 1.3 | 1.3 | 1.3 | 1.3 |
| | Stearic acid | | 2 | 2 | 2 | 2 | 2 | 2 | 2 | 2 | 2 | 2 |
| | Oil | | 16.5 | 16.5 | 16.5 | 16.5 | 16.5 | 16.5 | 16.5 | 16.5 | 16.5 | 16.5 |
| | Sulfur | | 1.5 | 1.5 | 1.5 | 1.5 | 1.5 | 1.5 | 1.5 | 1.5 | 1.5 | 1.5 |
| | Vulcanization accelerator NS | | 0.7 | 0.7 | 0.7 | 0.7 | 0.7 | 0.7 | 0.7 | 0.7 | 0.7 | 0.7 |
| | | Target value | | | | | | | | | | |
| Evaluation | E * a in tire circumferential direction (at 70° C.) | 8 to 20 | 10.2 | 15.0 | 8.5 | 20.0 | 12.3 | 14.8 | 12.0 | 13.5 | 12.1 | 15.3 |
| | E * b in tire radial direction (at 70° C.) | | 3.8 | 3.5 | 3.2 | 3.5 | 3.9 | 3.7 | 3.6 | 3.6 | 3.5 | 3.6 |
| | Ratio between E * a and E * b (%) | 1.05 to 6 | 2.7 | 4.3 | 2.7 | 5.7 | 3.2 | 4.0 | 3.3 | 3.8 | 3.5 | 4.3 |
| | tanδ (at 70° C.) in circumferential direction | <0.200 | 0.199 | 0.186 | 0.183 | 0.193 | 0.198 | 0.191 | 0.198 | 0.179 | 0.189 | 0.185 |
| | Elongation at break EB (%) in circumferential direction | >400 | 460 | 495 | 490 | 455 | 415 | 460 | 420 | 505 | 450 | 496 |
| | Sheet processability index | ≥90 | 95 | 100 | 110 | 90 | 90 | 95 | 90 | 100 | 90 | 100 |
| | Handling stability index | ≥110 | 115 | 135 | 115 | 150 | 125 | 135 | 125 | 130 | 125 | 135 |
| | Ride comfort index | ≥90 | 90 | 100 | 100 | 95 | 90 | 90 | 95 | 95 | 95 | 90 |

Table 2 shows that in examples using MBs obtained by mixing a specific microfibrillated plant fiber solution prepared using a circulation type or continuous homogenizer, with a rubber latex and a certain amount of a cationic polymer, the handling stability, ride comfort, and durability were improved in a balanced manner as compared to those in Comparative Example 1. Table 2 also shows that the elongation at break and processability in the examples were more favorable than in Comparative Examples 3 to 7 in which MB3, 13, 16, or 23 was used.

More specifically, in Comparative Example 2, since microfibrillated plant fibers were added during kneading, the microfibrillated plant fibers were not sufficiently dispersed in the rubber composition. Thus, the processability was remarkably poor.

In Comparative Example 3, since MB3, which contained microfibrillated plant fibers having too short a mean fiber length, was used, the complex modulus E* was low and therefore the handling stability and the like were poor.

In Comparative Examples 4 and 5, since MB13 and MB16, which contained microfibrillated plant fibers having too long a mean fiber length, were used, respectively, E* was low and therefore the handling stability and the like were poor.

In Comparative Example 6, since the amount of MB16 was increased compared with that in Comparative Example 5, E* was enhanced but the elongation at break and processability were further reduced and therefore the performance balance was deteriorated.

In Comparative Example 7, since MB 23, which was prepared from a microfibrillated plant fiber solution having too high a concentration, was used, the fuel economy, elongation at break, and processability were poor.

Here, the above examples show the results in the case where the rubber composition of the present invention is used in an inner sidewall layer. Similar tire performance enhancement effects can also be exhibited in cases where the rubber composition is used for other tire components such as a base tread, strip apex, clinch apex, or breaker edge strip.

REFERENCE SIGNS LIST

1: Inner sidewall layer
2: Outer sidewall layer
3: Strip apex
4: Base tread
5: Clinch apex

The invention claimed is:

1. A pneumatic tire, comprising a tread, a sidewall, an inner sidewall layer, a breaker cushion, a base tread, a tie gum, a bead apex, a clinch apex, a strip apex, or a breaker edge strip any of each is formed from a rubber composition formed from a masterbatch containing a rubber latex and microfibrillated plant fibers,
the masterbatch being obtained by stirring the microfibrillated plant fibers in a solvent with a circulation type or continuous homogenizer and mixing the resulting microfibrillated plant fiber solution with the rubber latex and a cationic polymer,
the microfibrillated plant fibers having a mean fiber length of 10 to 150 μm,
the microfibrillated plant fiber solution containing 0.1 to 2.0% by mass of the microfibrillated plant fibers, and
the cationic polymer being present in an amount of 0.01 to 5 parts by mass per 100 parts by mass of a rubber component of the rubber latex.

2. The pneumatic tire according to claim 1, wherein the masterbatch contains 5 to 30 parts by mass of the microfibrillated plant fibers per 100 parts by mass of the rubber component of the rubber latex.

3. The pneumatic tire according to claim 1, wherein the rubber composition contains 0.1 to 20 parts by mass of the microfibrillated plant fibers per 100 parts by mass of total rubber component in the rubber composition.

* * * * *